United States Patent [19]

Dall'Aglio

[11] Patent Number: 4,856,757
[45] Date of Patent: Aug. 15, 1989

[54] FLEXIBLE MEMBRANE FOR HEAVY DUTY APPLICATION APPARATUS

[76] Inventor: Marco Dall'Aglio, Via A. Grandi, 1-43045, Fornovo Taro (Parma), Italy

[21] Appl. No.: 171,908

[22] Filed: Mar. 22, 1988

[30] Foreign Application Priority Data

Mar. 27, 1987 [IT] Italy .................. 46823 A/87

[51] Int. Cl.$^4$ ............................................. F16K 31/00
[52] U.S. Cl. ......................................... 251/335.2; 92/99
[58] Field of Search .......................... 92/99; 251/335.2

[56] References Cited

U.S. PATENT DOCUMENTS

| | | | |
|---|---|---|---|
| 832,708 | 10/1906 | Thompson | 92/99 |
| 1,034,325 | 7/1912 | Tanner | 92/99 |
| 2,051,350 | 8/1936 | Smith | 251/335.2 |
| 2,289,722 | 7/1942 | Mueller et al. | 251/335.2 |
| 3,414,235 | 12/1968 | Lumpp | 92/99 |

Primary Examiner—A. Michael Chambers
Attorney, Agent, or Firm—Bucknam and Archer

[57] ABSTRACT

A membrane specifically designed for apparatus operating in sterile environments comprises a plurality of concentrical annular bodies bound to a surface of the membrane, and a plurality of radial pins bound to the annular bodies, the arrangement of the annular bodies and pins being so designed that they are able of supporting the pressure load acting on the membrane and discharging it on the peripheral regions of the movable and fixed bodies forming the structure of the device thereto the membrane is applied, which device may consist of a valve, a pressure gauge, a metering device or the like.

3 Claims, 1 Drawing Sheet

FLEXIBLE MEMBRANE FOR HEAVY DUTY APPLICATION APPARATUS

BACKGROUND OF THE INVENTION

The present invention relates to a flexible membrane spherically designed for heavy duty apparatus and, in particular, for apparatus operating in sterile environments, comprising a corrosion resistant sheet body provided with high strength mechanical characteristics both at low and high temperatures, possibly provided with one or more regions or region sets suitably shaped and adapted for easily deforming, which body is rigidly and tightly restrained at its outer and inner peripheral edges. On a side of this body there are arranged a plurality of annular concentric bodies which may slide with a coaxial relationship, and which are held in their positions adhering to said sheet body by means of radially extending pins the rounded ends or which engage in peripheral seats formed on fixed and movable bodies therebetween said sheet body is arranged.

As is known, in many industrial fields and, in particular in the chemical, drug and food industries, the processed products must constantly be held in sterile environments.

To this end a lot of apparatus have been designed and constructed able of providing the mentioned sterile conditions; in particular these conditions are obtained in autoclaves, in pressurized vessels and ducts: however, as it should be apparent to those skilled in the art, these sterile conditions can be hardly obtained in apparatus such as valves, pressure gauges, metering devices and the like.

In order to solve these problems in the latter apparatus tight pads and specifically designed resilient membranes have been already made, by using materials such as teflon and/or stainless steel.

In connection with thementioned tight pads it has been found that the valve driving stems, even if sheated in a very precise way, by using tightness rings adhering both to the walls of the valve bodies and to said stems, are not able of providing the required sterile conditions.

The elastic membranes, on the other hand, have provided remarkably better results, as shown, for example, in the Italian Patent Application No. 46,829 A/85 filed on Apr. 24, 1985 in the name of the same Applicant as the present invention.

However, under given conditions, the mentioned known elastic membranes have not been found to be able of resisting against heavy operation conditions.

This occurs mainly as, for given applications, there are used devices such as valves, metering apparatus and the like having rather long opening and closure strokes, and/or which must operate under a high pressure and/or a high temperature.

SUMMARY OF THE INVENTION

Accordingly, the main object of the present invention is to overcome the above mentioned drawbacks of known resilient or flexible membranes for heavy duty applications.

The present invention, as defined in the appended claims, solves this problem by providing a flexible membrane for apparatus operating under heavy conditions and, in particular, for apparatus which must operate in a sterile environment, which membrane provides the following advantageous results: the displacement of the membrane is associated with a corresponding displacement of a plurality of concentric rings and radially extending pins thereon the load of the operating pressure acting on the membrane is distributed; said concentric rings are held adhering to the membrane surface on the face of said membrane opposite to the face thereon the operating pressure is exerted; the radially extending pins hold said concentric ring adhering to the membrane and support the pressure load and discharge it on the fixed and movable structures thereto their round ends are hinged.

A main advantage of the present invention is that the inventive membranes, with the related rings and pins, are able of resisting against heavier conditions than the known membranes, while assuring a greater working stroke under very safe tightness conditions.

Another advantage of the present invention is that the inventive membranes have a longer useful life than known resilient membranes, since they are subjected to very reduced stresses, thereby reducing the maintenance time and costs.

BRIEF DESCRIPTION OF THE DRAWINGS

The invention will be disclosed in a more detailed way hereinafter, with reference to the accompanying drawing which illustrates, by way of a not limitative example, the membrane according to the present invention applied to a valve specifically designed for apparatus which must operate in sterile environments.

DESCRIPTION OF THE PREFERRED EMBODIMENT

Figure 1:
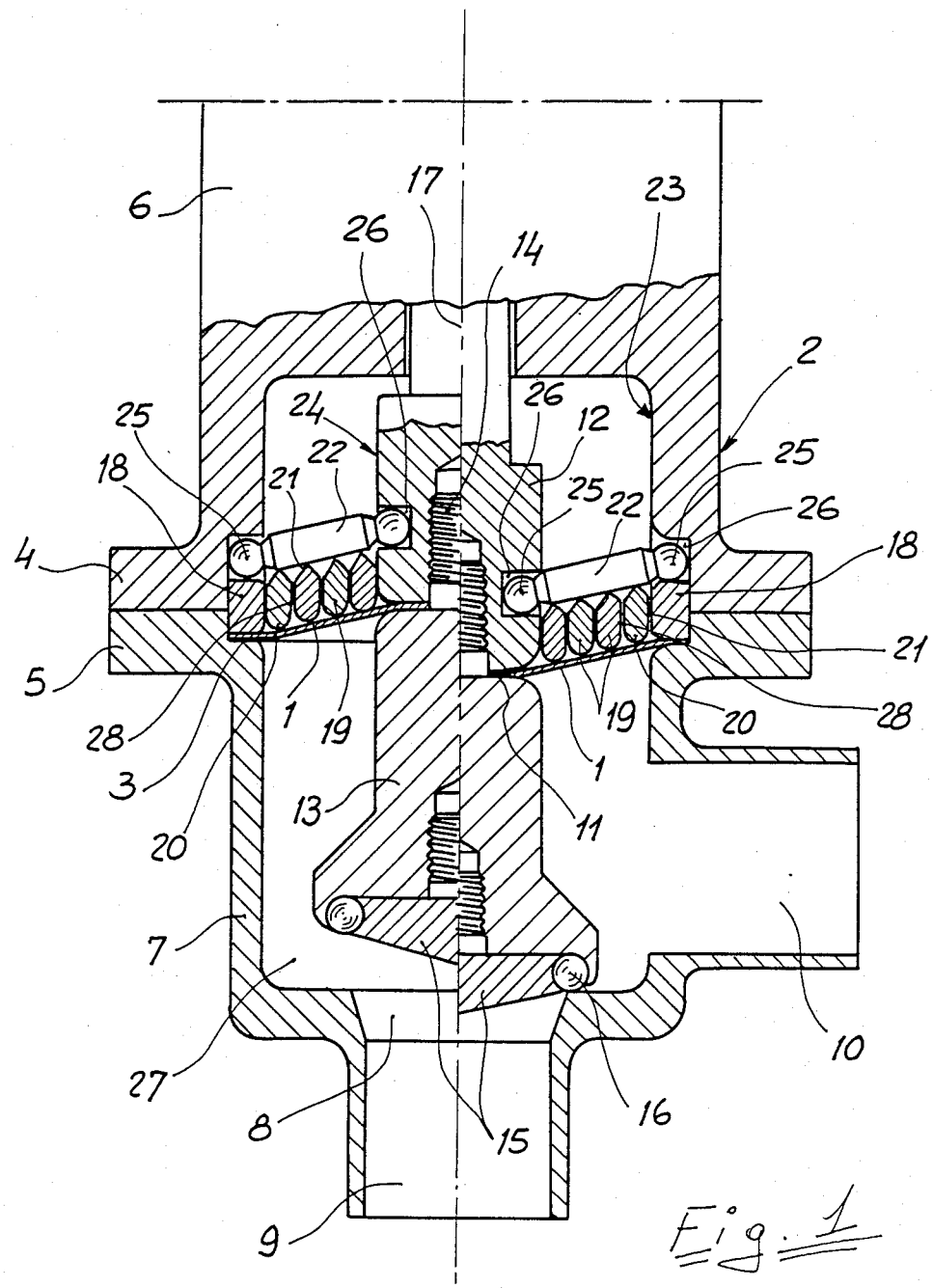

With reference to the accompanying drawing, the single FIGURE shows a flexible or resilient membrane 1 for heavy duty apparatus and, in particular, for apparatus which must operate in sterile environments, said membrane being applied to a valve 2.

The outer edge 3 of the membrane 1 is rigidly restrained between the outer coupling flanges 4 and 5 of the valve 2 driving top body 6 and of the bottom body 7, therein there are formed the passage seat 8, the inlet duct 9 and the outlet duct 10.

The inner edge 11 of the membrane 1 is rigidly restrained between the stubs 12 and 13 which, as they are mutually screw coupled by means of the threaded pin 14, will form the valve driving stem. To the lower end of this stem there is coupled the plug member 15, with a tightness ring 16, engaging in the seat 8.

The FIGURE partially shows the valve assembly in its operating position at the left of the symmetry axis 17 and, in its closure position, at the right of that same axis.

As shown, above the outer edge 3 of the membrane 1 there is arranged an annular pressing pad 18 which tightly rigidly locks the mentioned edge between the flanges 4 and 5. Likewise, the locking of the stubs 12 and 13 provides a tight coupling of the inner edge 11 of the membrane 1.

In order to provide a safer tightness between the mentioned elements, the peripheral edges 3 and 11 of the membrane 1, or the regions therebetween they are clamped, or both the portions, may be provided with annular slots, cuts or ridges so designed as to provide labyrinth pressure surfaces.

Alternately, between the regions or zones thereat the edges 3 and 11 of the membrne are clamped, gaskets may be applied.

Above the membrane 1 there are arranged concentric rings 19, preferably provided with rounded bottom ends 20 and pointed top ends 21.

The bottom rounded ends 20 will contact and adhere to the top surface of the membrane 1, whereas the pointed top ends 21 will contact and adhere to the outer surfaces of the round cross-section pins 22, radially extending between the inner peripheral surface 23 of the upper body 6 of the valve 2 and the outer peripheral surface 24 of the upper stub 13, forming the stem of said valve.

The pins 22, which are preferably made of a metal having suitable mechanical characteristics, are coupled to the surfaces 23 and 24 by means of their rounded or ballshaped ends 25 engaging in radial seats 26.

Thus the membrane 1 will be protected at the top thereof by a structure able of supporting the overall load exerted thereon by the pressure in the chamber 27.

As shown in the FIGURE, the rounded ends 25 form coupling means between the top fixed body 6 of the valve and its movable stem and can be oriented, depending on the displacement of the valve stem, so as the pins 22 are always held in contact with the underlying concentric rings 19 which, in turn, adhere to the membrane 1, both under closing conditions of the valve, and as it opens and the chamber 27 is subjected to the operating pressure.

The pressure load exerted on the membrane 1 is thus evenly distributed on the concentric rings 19, on the radially extending pins 22, their rounded ends 25 and hence on the wall of the fixed upper body 6 and on the movable stem of the valve 2.

The rings 19, which are preferably made of a strong material, such as a metal material, are provided with straight and smooth side surfaces 28 so as to allow for said surface to smoothly slide onto one another in the case of a contact occurring during the up and down displacement due to a displacement of the movable stem valve and radially extending pins.

The rounded ends 20 of the concentric rings 19 favour their fitting to the surface of the underlying membrane 1, whilst the pointed ends 21 favour the contact of the rings and radially extending pins 22.

In this connection, it should be however apparent that the end portions 20 and 21 may be formed with different configurations, depending on the configurations of the contact surfaces of the membrane 1 and radially extending pins 22.

In each case, the disclosed configuration is the preferred one, since it affords a continuous adaption of the contact of the membrane 1 and rings 19, through the rounded ends 20, whilst the pointed ends 21 favour a point contact between the rings 19 and pins 22, thereby the operating forces are always discharged in a vertical direction without generating side reaction stresses.

Thus, the rings 19 will mutually slide in the two directions, always coaxially and without any adhesions of the surfaces 28.

The membranes 1, which may be made of different materials, such as stainless steels, Teflon and the like, with the provision of concentric rings 19 and radially extending pins 22 may be used not only in valves of the type herein illustrated and disclosed, but also in other applications, such as pressure gauges, metering devices and the like, specifically designed for operating in sterile systems, operating under heavy conditions.

It should finally be pointed out that the number of the concentric rings 19 and radially extending pins may be any according to requirements.

While the invention has been disclosed and illustrated with reference to a preferred embodiment thereof, it should be apparent that the disclosed embodiment is susceptible to many modifications and variations all of which will come within the spirit and scope of the appended claims.

I claim:

1. A flexible membrane adapted to resist against high operating forces acting on said membrane, comprising a corrosion rsistant easily deformable sheet body, rigidly tightly coupled along peripheral outer and inner edges thereof, a plurality of concentric annular bodies, which can mutually slide and are held in their positions and adhering to a side of said sheet body by radially extending round cross-section pins having ball shaped ends engaging in peripheral seats formed on fixed and movable bodies therebetween said sheet body is arranged, said concentric annular bodies being provided with rounded ends adapted to contact and adhere to the surface of said sheet body and with pointed ends adapted to contact and adhere to the outer surface of said radially extending round cross-section pins, said pointed ends being so designed as to favour a point contact between said concentric annular bodies and said radially extending round cross-section pins so as to always discharge in a vertical direction the operating forces acting on said membrane.

2. A flexible membrane according to claim 1, wherein said ball-shaped ends of said round cross-section radially extending pins engage in peripheral seats formed on the surfaces of a fixed structure and movable structure forming the device thereto said sheet body of said membrane is applied.

3. A flexible membrane according to claim 1 wherein on said outer edge of said membrane there is applied an annular pressing pad adapted to rigidly lock said outer edge between flange members of said fixed structure and movable structure.

* * * * *